(12) United States Patent
Falempin et al.

(10) Patent No.: US 9,816,463 B2
(45) Date of Patent: Nov. 14, 2017

(54) RAMJET INCLUDING A DETONATION CHAMBER AND AIRCRAFT COMPRISING SUCH A RAMJET

(75) Inventors: François Falempin, Saint Arnoult (FR); Bruno Le Naour, Bourges (FR)

(73) Assignee: MBDA FRANCE, Paris (FR)

(*) Notice: Subject to any disclaimer, the term of this patent is extended or adjusted under 35 U.S.C. 154(b) by 642 days.

(21) Appl. No.: 14/116,003

(22) PCT Filed: May 9, 2012

(86) PCT No.: PCT/FR2012/000184
§ 371 (c)(1),
(2), (4) Date: Mar. 24, 2014

(87) PCT Pub. No.: WO2012/156595
PCT Pub. Date: Nov. 22, 2012

(65) Prior Publication Data
US 2014/0196460 A1 Jul. 17, 2014

(30) Foreign Application Priority Data
May 16, 2011 (FR) ...................... 11 01485

(51) Int. Cl.
*F02K 7/20* (2006.01)
*F02K 7/08* (2006.01)
(Continued)

(52) U.S. Cl.
CPC ............. *F02K 7/20* (2013.01); *F02K 7/08* (2013.01); *F02K 7/10* (2013.01); *F02K 7/00* (2013.01)

(58) Field of Classification Search
CPC ..... F02K 7/00; F02K 7/08; F02K 7/10; F02K 7/20
See application file for complete search history.

(56) References Cited

U.S. PATENT DOCUMENTS

| 3,040,516 A | 6/1962 | Brees |
| 3,240,010 A * | 3/1966 | Morrison ............ F02K 9/52 60/213 |

(Continued)

FOREIGN PATENT DOCUMENTS

| FR | 1007027 | 4/1952 | |
| FR | 1012068 | 7/1952 | |
| GB | 1069217 | * 5/1967 | ............ F02C 5/10 |

OTHER PUBLICATIONS

Braun et al., "Air breathing Rotating Detonation Wave Engine Cycle Analysis" AIAA-2010-7039, 46th AIAA/ASME/SAE/ASEE Joint Propulsion Conference & Exhibit, Nashville, TN, Jul. 25-28, 2010, pp. 1-13.*

(Continued)

*Primary Examiner* — Lorne Meade
(74) *Attorney, Agent, or Firm* — Duane Morris LLP; J. Rodman Steele, Jr.; Gregory M. Lefkowitz

(57) ABSTRACT

The invention relates to a ramjet including a detonation chamber and an aircraft comprising such a ramjet. According to the invention, the ramjet (S1) comprises an annular detonation chamber (2) having a continuous detonation wave and fuel injection means (6) for continuously injecting fuel (F2) directly into the chamber (2) just downstream of an air injection base (3). The fuel (F2) and the air (F1) are injected separately into the detonation chamber (2) in a permanent manner throughout the operation of the ramjet (S1).

6 Claims, 3 Drawing Sheets

(51) Int. Cl.
*F02K 7/10* (2006.01)
*F02K 7/00* (2006.01)

(56) References Cited

U.S. PATENT DOCUMENTS

| | | | |
|---|---|---|---|
| 3,604,211 A | | 9/1971 | Ghougasian |
| 3,692,041 A | * | 9/1972 | Bondi ........................ F02C 7/22 137/238 |
| 3,727,409 A | | 4/1973 | Kelley et al. |
| 3,777,488 A | * | 12/1973 | Gross ........................ F02K 7/10 244/53 B |
| 4,689,950 A | * | 9/1987 | Minardi ..................... F02K 7/08 60/204 |
| 4,756,154 A | * | 7/1988 | Minardi ..................... F02K 7/08 60/269 |
| 4,932,306 A | * | 6/1990 | Rom ........................ F42B 10/04 102/436 |
| 7,784,267 B2 | * | 8/2010 | Tobita ..................... C23C 24/04 60/247 |
| 2014/0245714 A1 | * | 9/2014 | Falempin .................. F02C 3/14 60/39.52 |

OTHER PUBLICATIONS

Falempin, F., "Continuous Detonation Wave Engine", Advances on Propulsion Technology for High-Speed Aircraft, RTO-EN-AVT-150, Paper 8, Neuilly-sur-Seine, France, 2008, pp. 8-1 to 8-16.*
Lu, et al., "Rotating Detonation Wave Propulsion: Experimental Challenges, Modeling, and Engine Concepts", AIAA-2011-6043, 47th AIAA/ASME/SAE/ASEE Joint Propulsion Conference & Exhibit, San Diego, CA, Jul. 31-Aug. 3, 2011, pp. 1-20.*
Kailasanath, K., "Review of Propulsion Applications of Detonation Waves", AIAA Journal, vol. 38, No. 9, Sep. 2000, pp. 1698-1708.*
Nicholls, J. A. and Cullen, R. E., "The Feasibility of a Rotating Detonation Wave Rocket Motor," Final Report RPL-TDR-64-113, University of Michigan, Apr. 1964, pp. 1-310.*

* cited by examiner

RAMJET INCLUDING A DETONATION CHAMBER AND AIRCRAFT COMPRISING SUCH A RAMJET

CROSS-REFERENCE TO RELATED APPLICATIONS

This application is a §371 national stage entry of International Application No. PCT/FR2012/000184, filed May 9, 2012, which claims priority to French Patent Application No. 1101485, filed May 16, 2011, the entire contents of which are incorporated herein by reference.

The present invention relates to ramjets including a detonation chamber, as well as aircraft, such as missiles or the like, propelled by such ramjets.

It is known that the operation of ramjets may be based on the implementation of a thermodynamic detonation cycle during which the combustion by detonation is effected very quickly in a very small thickness of detonating mixture, such that said mixture does not have time to expand. Thus the increase in pressure is limited.

Such ramjets may take the form of pulsed detonation engines (also designated as PDE), of which the operation is characterised by the filling of a detonation chamber with a fresh explosive fuel-oxidant mixture (the oxidant generally being air), then by the initiation of the detonation of the said explosive mixture by a supply of energy. An overpressure which appears in the region of a thrust wall is maintained in the course of the displacement of the detonation wave along the detonation chamber, which momentarily creates a thrust. It is then necessary to wait for the emptying of the hot gases coming from the combustion reaction in the detonation chamber, then filling it with fresh explosive mixture before being able to start a new detonation wave to cause a new thrust impulse.

However, the pulsed nature of the thrust obtained by such ramjets (the frequency of which is generally between 50 Hz and 200 Hz) creates, on the one hand, a very severe vibratory environment for the rest of the aircraft carrying the ramjet and necessitates, on the other hand, a significant supply of power with each cycle in order to initiate the detonation, which proves particularly problematic when fuel-oxidant mixtures are used which are not very explosive.

The object of the present invention is to remedy these drawbacks and, especially, to provide a ramjet with improved performance.

To this end, according to the invention, the ramjet which operates with an explosive fuel-air mixture and comprises:
- at least one detonation chamber which is equipped, at its upstream end, with an air injection base and which terminates, at its downstream end, with an exhaust nozzle;
- at least one air intake connected to said detonation chamber in order to be able to supply it with air; and
- means for injecting fuel into said detonation chamber, is remarkable:
- in that said detonation chamber is annular and of the continuous detonation wave type;
- in that said fuel injection means are formed for continuously injecting fuel directly into said detonation chamber just downstream of said air injection base; and
- in that the injection of fuel and the injection of air into said detonation chamber are carried out continuously separately from one another in the course of operation of said ramjet.

Thus by means of the invention the ramjet including a detonation chamber of the continuous detonation wave type (also known as CDWE (continuous detonation wave engine)) makes it possible to obtain—inside the detonation chamber—a continuous production of hot gases by self-sustaining detonation waves.

In fact, the fresh explosive mixture is formed continuously in the detonation chamber at its upstream end. A detonation wave can be started by a conventional means (exploding bridge wire, pre-detonation tube, etc.). This wave propagates circumferentially in the fresh explosive mixture, whilst the hot gases which it produces expand in the rest of the detonation chamber. As the injection of fresh fuel and air into the detonation chamber is continuous, when the detonation wave returns to its starting point it once again encounters the fresh explosive fuel-air mixture and continues its circumferential movement which therefore becomes continuous. More precisely, downstream of the detonation wave, and after the initial expansion of the hot gases, a layer of fresh mixture develops which, because it is in contact with the hot gases and under some conditions, causes the appearance of a new self-initiated detonation wave. Thus an annular detonation chamber is obtained in which a series of circumferential detonation waves moving at a plurality of kHz frequencies (up to 30 kHz) produces hot gases which expand towards the open end of the detonation chamber before being accelerated by the exhaust nozzle in order to obtain thrust.

Furthermore, from the point of view of the thermodynamic cycle, the detonation of the ramjet according to the invention has an efficiency 15 to 25% greater than that of a combustion at constant pressure implemented in a pulsed detonation engine, which makes it possible in particular to reduce the fuel consumption for equivalent performance (the improvement of the thermodynamic efficiency being accompanied by a very substantial increase in combustion efficiency) and to increase the flight ceiling.

Moreover, the operating principle of such a ramjet remedies the problem of the very severe vibratory environment created by a pulsed detonation engine.

It will also be noted that:
- the ramjet according to the invention could dispense with an integrated accelerator either by reducing the minimum operating Mach (for example to Mach 1.2), or by functioning first in anaerobic mode by consuming an oxidant carried on board the vehicle (which corresponds to an initial acceleration in rocket mode), then switching as soon as possible to aerobic mode; and
- as the fuel and the air are injected separately into the detonation chamber, any untimely ignition upstream of the detonation chamber is prevented. Preferably, the fuel can be injected into the detonation chamber after having previously been at least partially vaporised.

Preferably, said ramjet comprises an air injection system which is interposed between said air inlet and said detonation chamber and which comprises at least one channel, for example in the form of an annular slot, which opens into said detonation chamber in order to supply it with air.

Thus the air injection system enables distribution of fresh air—previously slowed down in order to reach a subsonic speed—at the entrance of the detonation chamber by one or more annular slots, whilst ensuring decoupling between the air intake and the detonation chamber. Of course, the provision of channels other shapes to replace the annular slots may be envisaged.

Also, the ramjet according to the invention comprises means for local control of the flow of fresh air entering said detonation chamber.

Thus, by local control of the incoming air flow, for example along the circumference of said detonation chamber, it is possible to modify locally, within said chamber, the variation in the richness of the explosive fuel-air mixture by increasing or decreasing the proportion of fresh air at any desired location in said chamber. Such a local adjustment of the richness of the explosive mixture allows the orientation of the thrust at the outlet of the exhaust nozzle to be controlled, without implementation of a complex flow orientation system.

Furthermore, the ramjet may advantageously comprise at least one circuit for cooling of said detonation chamber in which fuel can circulate before its injection therein. This cooling circuit (also designated as a regenerative circuit) makes it possible to pre-vaporise the fuel before its injection into said detonation chamber, so as to obtain satisfactory mixing and detonation conditions without carrying out pre-mixing.

Preferably, said cooling circuit extends along at least one side wall of said detonation chamber, over at least a portion of the length thereof.

Thus the detonation chamber can be cooled with the aid of a part or all of the fuel before it is injected into said chamber. This makes it possible to ensure the thermal resistance of the detonation chamber by vaporising at least some of the fuel to be injected in the course of its circulation in said circuit. Direct injection of the pre-vaporised fuel—in particular when said fuel is stored initially in the liquid state—guarantees the initiation and the stability of the detonation of the explosive fuel-air mixture. Thus any problem associated with the evaporation period of the drops of fuel and the chemical reaction.

It should be noted that such a circuit could also participate in the cooling of the exterior wall of the ramjet.

Moreover, said exhaust nozzle has no sonic throat and preferably has a short length. In fact, as the flow is already supersonic downstream of the detonation chamber, the exhaust nozzle without sonic throat makes it possible to obtain the desired thrust.

Furthermore, said fuel injection means may comprise at least four supply units (for example formed respectively by an angular supply segment and a corresponding valve) regularly distributed along the circumference of said detonation chamber, of which the associated fuel flows are either identical, or different, or modifiable over time independently of one another.

Thus, by local control of the incoming fuel flow, it is possible to modify locally, within said chamber, the variation in the richness of the explosive fuel-air mixture by increasing or decreasing the proportion of fuel in the region of the supply units. Such a local adjustment of the richness of the explosive mixture allows the orientation of the thrust at the outlet of the exhaust nozzle to be controlled, without implementation of a complex flow orientation system.

Preferably, said diametrically opposite supply units are coupled two by two and the fuel supply flow of said coupled supply units is advantageously controlled by means of a variable-flow distributor.

Thus, the variable-flow distributor makes it possible to increase the fuel flow rate associated with a first supply unit and to reduce the flow rate associated with a second supply unit, diametrically opposite the first unit to which it is coupled. In this way a local variation of the richness of the explosive fuel-air mixture can be obtained, which allows the orientation of the thrust at the outlet of the exhaust nozzle to be controlled.

As a variant, independent control of the fuel flow of each of the supply units can be implemented.

Moreover, in a particular embodiment of the invention:
the ramjet according to the invention may comprise at least two concentric detonation chambers of the continuous detonation wave type capable of being continuously supplied with air; and
said fuel injection means can be formed for continuously injecting fuel directly into at least one of said concentric detonation chambers.

Thus, it is possible to obtain satisfactory performance over a wide range of overall richness of the explosive fuel-air mixture. In fact, the fuel may be injected:
either into the two detonation chambers for operation of the ramjet with a high overall richness. In this case, a sequential ignition of the concentric detonation chambers can be implemented in order to reduce the ignition shocks;
or into one of the two detonation chambers for operation of the ramjet with a lower overall richness. The supersonic flow of hot gases coming from the detonation chamber supplied with fuel then results in the subsonic cold flow coming from the other detonation chamber. For example, when the ramjet is mounted on the body of a missile, it is preferable to supply the internal detonation chamber—rather than the external detonation chamber—so as to better supply the base region of the central body of the missile in order to limit the drag thereof and to reduce the signatures thereof.

It is obvious that the invention is not limited to two concentric detonation chambers, but could also use more than two concentric detonation chambers.

It will also be noted that said air intake can be axially symmetrical, two-dimensional, or indeed three-dimensional.

Moreover, the present invention also relates to an aircraft which comprises at least one ramjet of the type described above.

The figures of the appended drawings will provide a good understanding of how the invention can be carried out. In these drawings, identical references designate similar elements.

Figure 1:
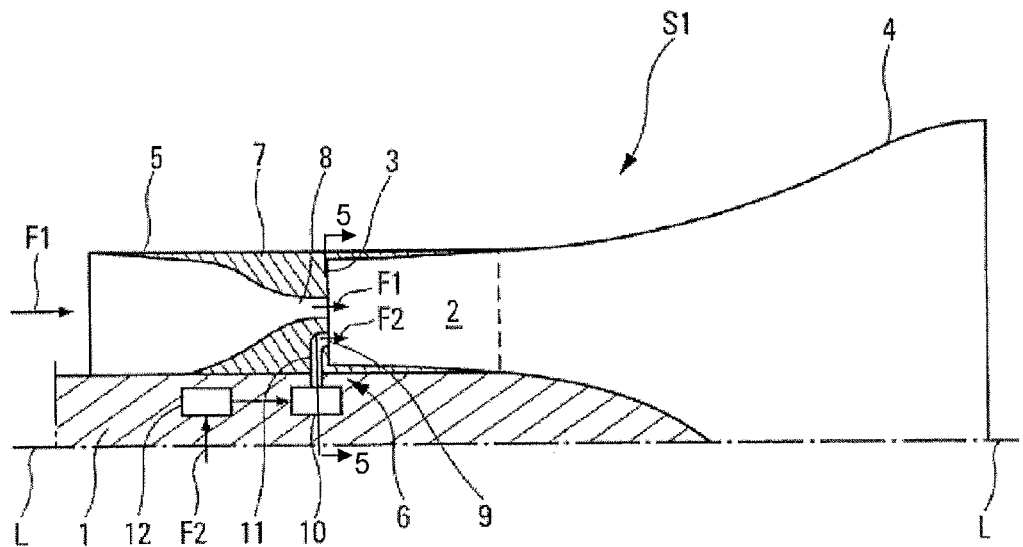
FIG. 1 is a schematic partial axial cross-section of a first example of a ramjet according to the present invention.

In FIG. 1, a first embodiment of a ramjet S1 with a detonation chamber according to the present invention is shown mounted on an aircraft 1. It has a longitudinal axis of symmetry L-L. Upstream and downstream are defined below in relation to the air flow direction.

The ramjet S1 which operates with an explosive fuel-air mixture comprises
a circular annular detonation chamber 2 which is equipped, at its upstream end, with an air injection base 3 and which terminates, at its downstream end, with an exhaust nozzle 4 without a sonic throat. The detonation chamber 2 is of the continuous detonation wave type;

an annular air intake 5 which is connected to the detonation chamber 3 in order to be able to supply it with air (which is symbolised by the arrow F1); and means 6 for continuously injecting fuel (symbolised by the arrow F2) directly into the detonation chamber 2 just downstream of the air injection base 3, for example through said air injection base as shown in FIG. 1.

During operation of the ramjet S1, the injection of fuel F2 and the injection of air F1 into the detonation chamber 2 are carried out separately from one another and continuously. In other words, the fresh explosive fuel-air mixture is formed in the detonation chamber 2. According to the invention, no premixing is carried out.

Furthermore, the ramjet S1 comprises an air injection system 7 which is annular and circular and is interposed between the air intake 5 and the detonation chamber 2. The air injection system 7 comprises for example an annular slot 8 which forms an annular air supply channel opening into the detonation chamber 2. Of course, as a variant, a plurality of concentric annular slots or any other desired supply channel geometry could be implemented.

Figure 5:
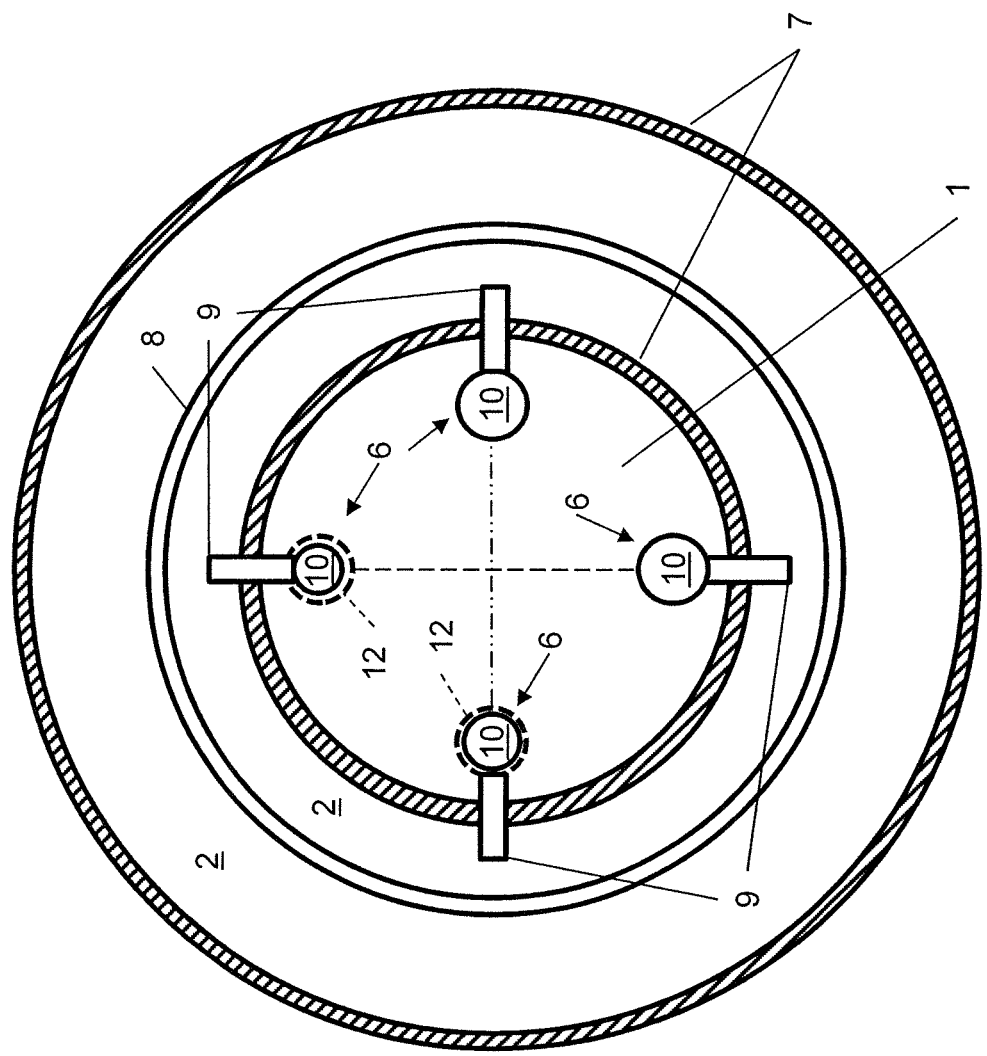
FIG. 5 is a cross section of a ramjet taken across section line 5-5 of FIG. 1.

In the example of FIG. 1 and FIG. 5, the fuel injection means comprise four supply units 6 regularly distributed along the circumference of the detonation chamber 2. Each supply unit 6 is formed by an angular supply segment 9 (for example in the form of a multiperforation of the air injection base 3) and a valve 10, connected thereto by a channel 11.

The diametrically opposite supply units 6 may be coupled two by two and the fuel supply flow of said coupled supply units is advantageously controlled by means of a variable-flow distributor 12 connected to the corresponding valves 10 (a single valve is shown in FIG. 1). In other words, in this example two variable-flow distributors 12 are used, each distributor 12 controlling two coupled supply units 6. In FIG. 5, the variable-flow distributors 12 are shown in phantom for reference, but according to FIG. 1, are located outside of the plane of section line 5-5.

Thus, the variable-flow distributor 12 makes it possible to increase the fuel flow rate associated with a first supply unit 6 and to reduce the flow rate associated with a second supply unit 6, diametrically opposite the first unit to which it is coupled. Thus a local variation of the richness of the explosive fuel-air mixture can be obtained, which enables control of the orientation of the thrust at the outlet of the exhaust nozzle 4.

Figure 2:
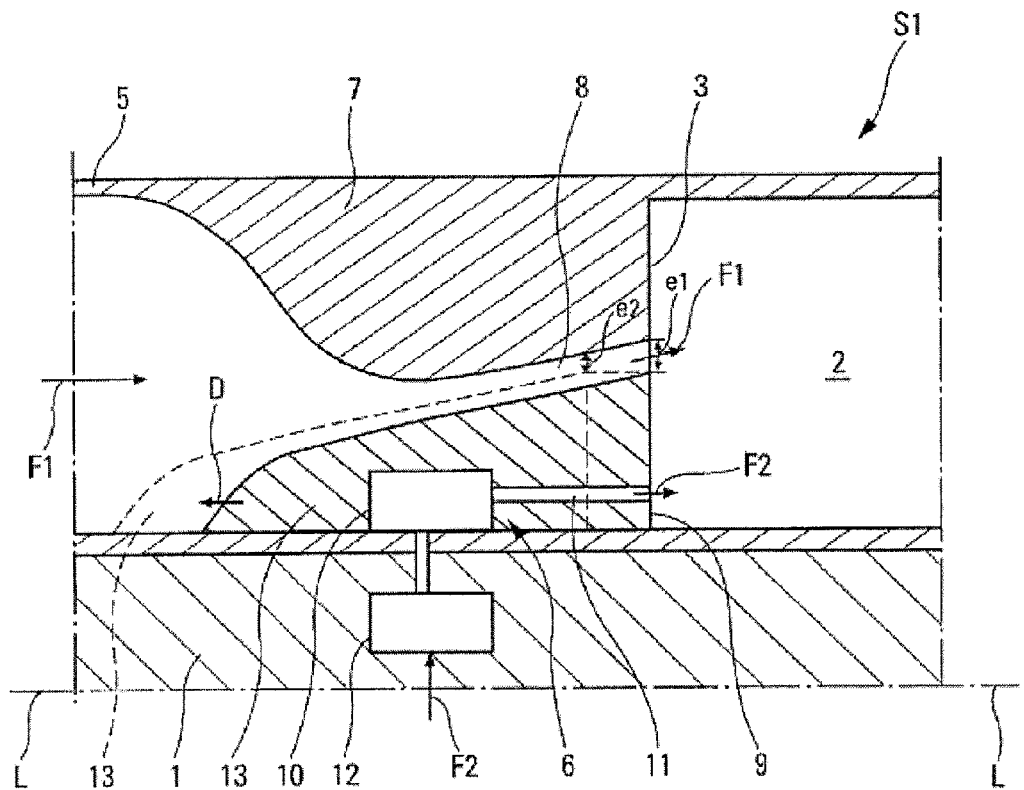
FIG. 2 shows, in an enlarged schematic cross-sectional view, an example of means for adjustment of the air flow of the ramjet of FIG. 1.

Also, as FIG. 2 shows, the ramjet Si also comprises means 13 (not shown on FIG. 1) for local control of the flow of fresh air entering the detonation chamber by means of the annular slot 8.

In particular, the control means may be in the form of one or more motorised slide valves 13 capable of reducing, over a defined angular portion, the thickness of the transverse annular section of the slot 8.

Thus FIG. 2 shows:

by solid lines, a first end position of a slide valve 13 in which the angular portion of the transverse annular section of the associated slot 8 has a maximum thickness e1; and by broken lines, a second end position of the slide valve 13, after displacement thereof upstream (the displacement being symbolised by the arrow D), in which the angular portion of the transverse annular section of the associated slot 8 has a minimum thickness e2, i.e. e2<e1).

Thus, by local control of the incoming air flow, it is possible to modify locally, within said chamber, the variation in the richness of the explosive fuel-air mixture by increasing or decreasing the proportion of fresh air. Such a local adjustment of the richness of the explosive mixture enables a control of the orientation of the thrust at the outlet of the exhaust nozzle.

Figure 3:
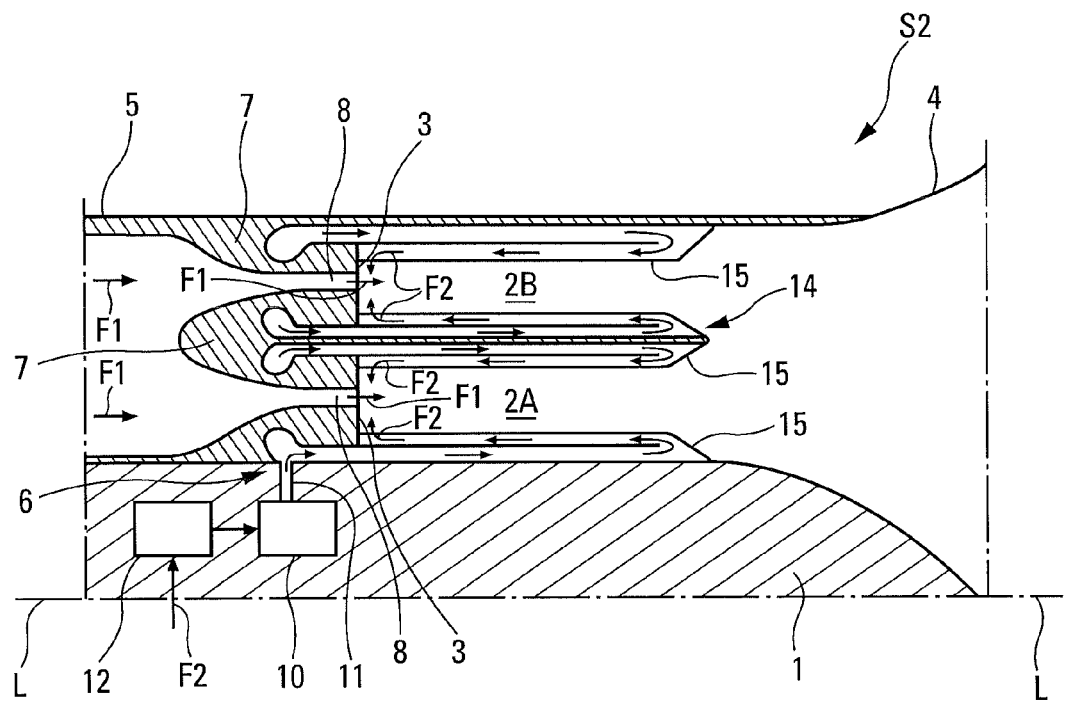
FIG. 3 is a schematic partial axial cross-section of a second example of a ramjet according to the present invention.

Moreover, in contrast to the example of FIG. 1, the ramjet S2 illustrated by FIG. 3, comprises two concentric annular detonation chambers 2A and 2B of the continuous detonation wave type which are supplied continuously with air F1 originating from the air intake 5. The detonation chambers 2A and 2B—the external chamber 2B surrounding the internal chamber 2A—are similar to the detonation chamber 2 described in relation to FIG. 1.

Also, as FIG. 3 shows, a cooling circuit 14 of the detonation chambers 2A and 2B—in which fuel F2 can circulate before its injection therein—is integrated with the ramjet S2. The cooling circuit 14 is in the form of annular conduits 15 which are independent of one another.

Each annular conduit 15 extends along a side wall of one of the detonation chambers 2A, 2B, on the face thereof which is oriented towards the detonation zone.

Each conduit 15 is also folded back on itself in order to enable circulation of the fuel from upstream to downstream from the air injection base 3, along the side wall of the corresponding detonation chamber 2A, 2B, then from downstream to upstream in order to inject fuel F2 in pre-vaporised form in the vicinity of the base 3, as illustrated in FIG. 3.

In this example, the means 6 for injecting fuel into the detonation chambers 2A and 2B also comprise the annular conduits 15. Said conduits are connected to the valves 10 by means of the corresponding channels 11.

The fuel injection means 6 are formed for continuously injecting fuel directly into at least one of the two concentric detonation chambers 2A, 2B, by means of the corresponding conduits 15.

Thus the fuel may be injected:

either into the two detonation chambers 2A and 2B for operation of the ramjet S2 with a high overall richness;

or into one of the two detonation chambers 2A, 2B for operation of the ramjet S2 with a lower overall richness.

It is obvious that the cooling circuit 14 of the ramjet S2 of FIG. 3 could likewise be used on the ramjet S1 of FIG. 1.

Figure 4:
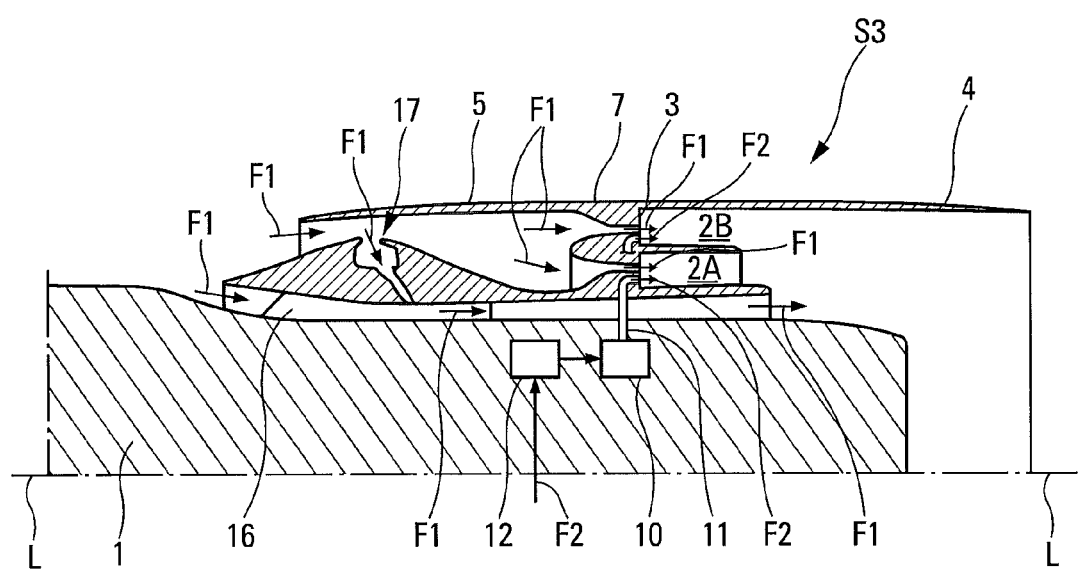
FIG. 4 is a schematic partial axial cross-section of a third example of a ramjet according to the present invention.

In the third example according to FIG. 4, the ramjet S3 is similar to the ramjet S2 of FIG. 3 (although the cooling circuit 14 is not shown for reasons of clarity), except for the fact that it also includes an external trap 16 making it possible to collect the boundary layer which has developed on the fuselage of the aircraft 1 upstream of the air intake 5. Thus there is a very short air intake 5 of which the extension directly constitutes the exhaust nozzle 4.

The external trap 16, in the form of an annular passage, is interposed between the air intake 5 and the body of the aircraft 1 and extends longitudinally along said aircraft to open into the exhaust nozzle 4.

The ramjet S3 may also comprise an internal trap 17, arranged in the upstream part of the side wall of the external trap 16, which makes it possible to collect a part of the flow received by the air intake 5 in order to re-inject it into the annular passage of the external trap 16.

At the outlet of the chamber, the jet of hot gases at the outlet of the detonation chambers 2A and 2B more or less drives the air stream trapped by the external and internal traps 16 and 17. Regardless of the intensity of the driving effect (low or high), the drag associated with these traps 16 and 17 is substantially limited by using their air streams in order to supply the base region of the central body of the aircraft 1.

Moreover, an auxiliary injection of pure oxygen into the air stream passing through the air intake 5 or the air injection system 7 may be carried out in order to dope said air stream F1 and ensure satisfactory operation at reduced Mach.

Thus by means of the invention a ramjet is obtained which has a very short detonation chamber by comparison with known ramjets having a detonation chamber:

- which frees the entire front portion of the aircraft 1 (no long ventral or side intake of air which often requires complicated mechanical designs);
- which can operate at richness 1 (whereas it is difficult to make a conventional hydrocarbon ramjet operate at a burned richness above 0.75) which, added to the better thermodynamic performance, makes it possible to reduce very substantially the flow of air collected and therefore the size of the air intake in order to produce equivalent thrust; and
- which can function from Mach 1.2 by virtue of the thermodynamic cycle which increases the pressure in the detonation chamber or chambers.

The invention claimed is:

1. Ramjet which operates with an explosive fuel-air mixture and comprises:
    at least two concentric detonation chambers (2A, 2B), the at least two concentric detonation chambers (2A, 2B) equipped at an upstream end with an air injection base (3) and a downstream end of said at least two concentric detonation chambers terminates at an exhaust nozzle (4);
    at least one air intake (5) connected to said concentric detonation chambers (2A, 2B) in order to be able to supply the concentric detonation chambers with air (F1); and
    means (6) for injecting fuel into said detonation chambers (2A, 2B), wherein:
    said concentric detonation chambers (2A, 2B) are annular and of the continuous detonation wave type capable of being continuously supplied with air;
    said means (6) for injecting fuel are formed for continuously injecting fuel (F2) directly into said concentric detonation chambers just downstream of said air injection base; and
    the injection of fuel and the injection of air into said concentric detonation chambers are carried out continuously separately from one another in the course of operation of said ramjet (S1, S2, S3),
    wherein said means (6) for injecting fuel are formed for continuously injecting fuel (F2) directly into at least one of said concentric detonation chambers (2A, 2B).

2. Ramjet according to claim 1, wherein it also comprises an air injection system (7) which is interposed between said air inlet (5) and said at least two concentric detonation chambers (2A, 2B) and which comprises at least one channel (8).

3. Ramjet according to claim 2, wherein the at least one channel (8) is in the form of an annular slot penetrating the base (3), which opens into one of said at least two concentric detonation chambers (2A, 2B) in order to supply said detonation chamber with air.

4. Ramjet according to claim 1, wherein said means for injecting fuel comprise at least four supply units (6) regularly distributed along the circumference of said at least two concentric detonation chambers (2A, 2B), of which the associated fuel flows are either identical, or different, or modifiable over time independently of one another.

5. Ramjet according to claim 1, wherein said air intake (5) is axially symmetrical.

6. Aircraft, wherein it comprises at least one ramjet (S2, S3) of the type specified in claim 1.

\* \* \* \* \*